United States Patent
Anders et al.

(10) Patent No.: US 11,188,868 B2
(45) Date of Patent: Nov. 30, 2021

(54) DIRECTIONALLY-ENABLED SMART SHIPPING LABELS

(71) Applicant: International Business Machines Corporation, Armonk, NY (US)

(72) Inventors: Kelley Anders, East New Market, MD (US); Lisa Seacat DeLuca, Baltimore, MD (US); Jeremy R. Fox, Georgetown, TX (US); Jeremy A. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 16/142,431

(22) Filed: Sep. 26, 2018

(65) Prior Publication Data
US 2020/0097902 A1  Mar. 26, 2020

(51) Int. Cl.
*G06Q 10/08* (2012.01)
*G08B 13/14* (2006.01)
*G06K 19/06* (2006.01)

(52) U.S. Cl.
CPC ..... *G06Q 10/0833* (2013.01); *G08B 13/1427* (2013.01); *G06K 19/06028* (2013.01)

(58) Field of Classification Search
CPC ............. G06Q 10/083; G06Q 10/0833; G06Q 10/0832; G06Q 10/0835; G06Q 10/0837; G06Q 10/0838
See application file for complete search history.

(56) References Cited

U.S. PATENT DOCUMENTS

| | | | |
|---|---|---|---|
| 2013/0346336 A1* | 12/2013 | Murphy | G06Q 10/08 |
| | | | 705/333 |
| 2015/0262123 A1 | 9/2015 | Sharma et al. | |
| 2016/0063433 A1* | 3/2016 | Glasgow | G06Q 10/0832 |
| | | | 705/332 |
| 2016/0195566 A1 | 7/2016 | Vock et al. | |
| 2017/0083857 A1* | 3/2017 | Barton | G06Q 10/0833 |
| 2017/0262798 A1 | 9/2017 | Kosseifi et al. | |
| 2018/0046980 A1* | 2/2018 | Siminoff | G01S 19/24 |

(Continued)

FOREIGN PATENT DOCUMENTS

| JP | 2017114632 A | 6/2017 |
|---|---|---|
| WO | 2017/091826 A1 | 6/2017 |

OTHER PUBLICATIONS

Boyden et al., "Untethered Trailer Tracking and Control System", Department of Transportation Federal Motor Carrier Safety Administration Report, Dec. 2005.*

(Continued)

*Primary Examiner* — Emmett K. Walsh
(74) *Attorney, Agent, or Firm* — Stephanie Carusillo; Hunter E. Webb; Keohane & D'Alessandro, PLLC (57) ABSTRACT

Aspects of the present invention provide an approach for safeguarding a package for successful delivery. In an embodiment, a current location of a package, delivered but left outside its desired delivery location, is received from a smart label affixed to the package. The location and directional movements of the package are monitored. If the package is moved beyond a predefined distance threshold (e.g., 30 feet from a desired delivery residence), a threshold violation notification is sent to at least one party (e.g., customer, delivery service, police department, etc.) providing an alert of a potential theft of the package.

17 Claims, 6 Drawing Sheets

(56) References Cited

U.S. PATENT DOCUMENTS

2018/0350214 A1* 12/2018 Roth ................ G08B 13/19669
2019/0354928 A1* 11/2019 Hughes .............. G06K 9/00288

OTHER PUBLICATIONS

Miike Grabham, Kickstarter, "The Package Guard", https://www.kickstarter.com/projects/packageguard/the-package-guard, Kickstarter, PBC Copyright 2018, 12 pages.
Miike Kavis, "The Smart Labels That Will Power the Internet of Things", https://www.forbes.com/sites/mikekavis/2015/02/17/the-smart-labels-tha . . . , Feb. 17, 2015, 2 pages.
Thin Film, http://thinfilm.no/, Copyright 2018 Thinfilm, 9 pages.

* cited by examiner

DIRECTIONALLY-ENABLED SMART SHIPPING LABELS

TECHNICAL FIELD

The subject matter of this invention relates generally to package theft prevention. More specifically, aspects of the present invention provide a solution for safeguarding a package for successful delivery using a directionally-enabled smart shipping label.

BACKGROUND

Every day millions of parcels, large and small, are delivered to households and companies all around the world by delivery companies. More and more people today purchase goods from distant sources instead of buying them on site in local shopping malls or at local retail stores. Typically, a consumer orders goods from a source via the Internet or other means and selects a delivery service, such as regular ground, next-day speed delivery, etc. As proof of a successful transaction, the consumer might receive a confirmation number and thereafter expect the ordered goods to be delivered to their residence.

Purchasing items online and having packages containing such items delivered to your home is in this day and age nearly effortless. However, many deliveries don't require a signature and are left at a doorstep when no one is at home. In this situation, the delivered package is vulnerable to theft until the package is retrieved from the doorstep. Individuals, particularly during the holiday season, may follow delivery trucks and watch the drivers of such delivery trucks deliver packages to the doorsteps of purchasers. The individuals may simply wait for a delivery driver to deposit a package on the doorstep of a purchaser and then go and steal the package off the doorstep before the purchaser has a chance to retrieve the package.

SUMMARY

In general, aspects of the present invention provide an approach for safeguarding a package for successful delivery. In an embodiment, a current location of a package, delivered but left outside its desired delivery location, is received from a smart label affixed to the package. The location and directional movements of the package are monitored. If the package is moved beyond a predefined distance threshold (e.g., 30 feet from a desired delivery residence), a threshold violation notification is sent to at least one party (e.g., customer, delivery service courier, police department, neighbor, etc.) providing an alert of a potential theft of the package.

One aspect of the present invention includes a computer-implemented method for safeguarding a package for delivery, comprising: receiving, from a smart label having one or more sensors, a current location of the package; monitoring the location and a directional movement of the package; responsive to a determination of an occurrence of a threshold violation associated with the package, transmitting a threshold violation notification.

Another aspect of the present invention includes a computer program product embodied in a computer readable medium that, when executed by a computer device, performs a method for safeguarding a package for delivery in a networked computing environment, the method comprising: receiving, from a smart label having one or more sensors, a current location of the package; monitoring the location and a directional movement of the package; responsive to a determination of an occurrence of a threshold violation associated with the package, transmitting a threshold violation notification.

Yet another aspect of the present invention includes a computer system for safeguarding a package for delivery in a networked computing environment, the computer system comprising: a memory medium comprising instructions; a bus coupled to the memory medium; and a processor coupled to the bus that when executing the instructions cause the system to: receive, from a smart label having one or more sensors, a current location of the package; monitor the location and a directional movement of the package; responsive to a determination of an occurrence of a threshold violation associated with the package, transmit a threshold violation notification.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for safeguarding a package for successful delivery. In an embodiment, a current location of a package, delivered but left outside its desired delivery location, is received from a smart label affixed to the package. The location and directional movements of the package are monitored. If the package is moved beyond a predefined distance threshold (e.g., 30 feet from a desired delivery residence), a threshold violation notification is sent to at least one party (e.g., customer, delivery service, police department, etc.) providing an alert of a potential theft of the package.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
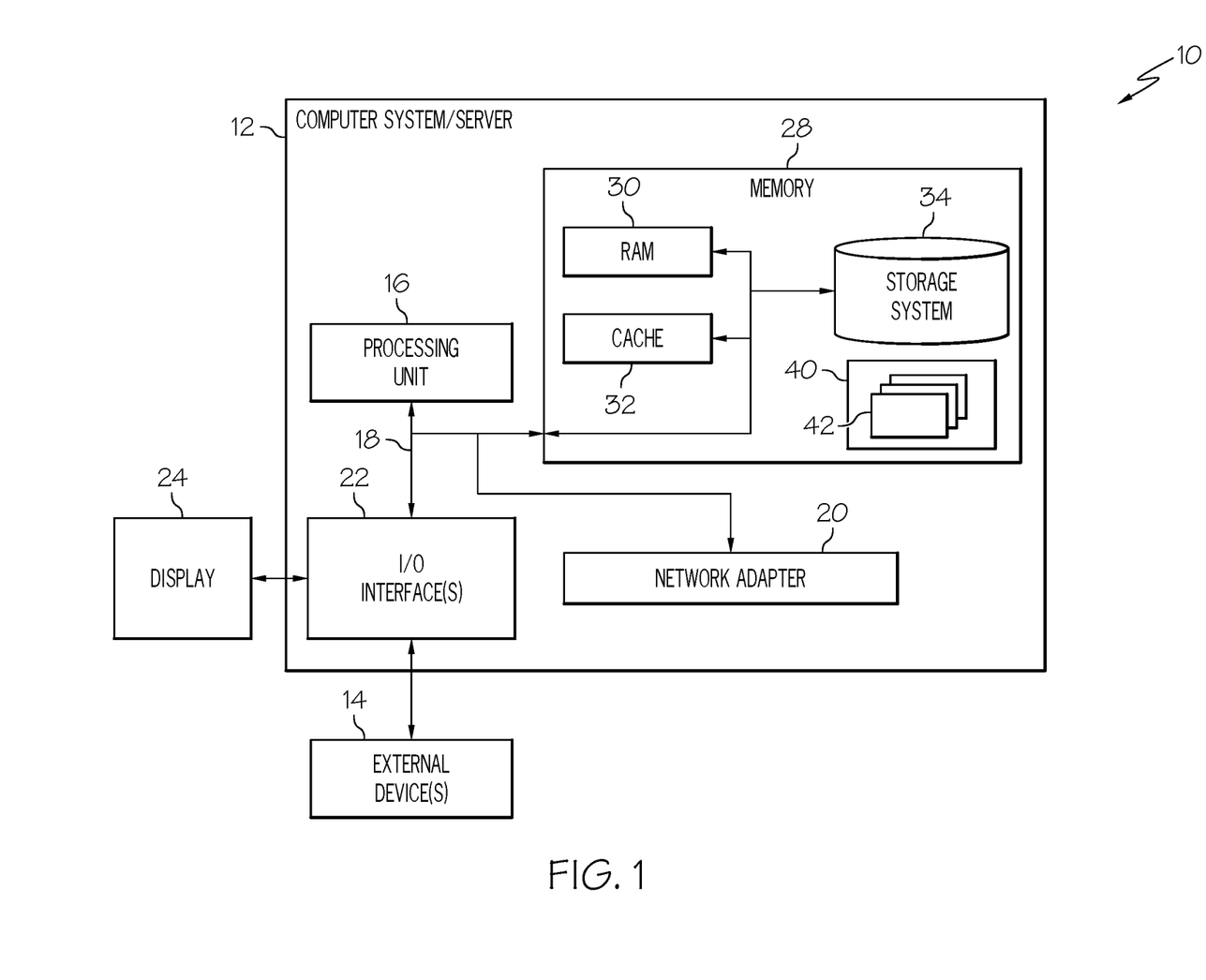
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
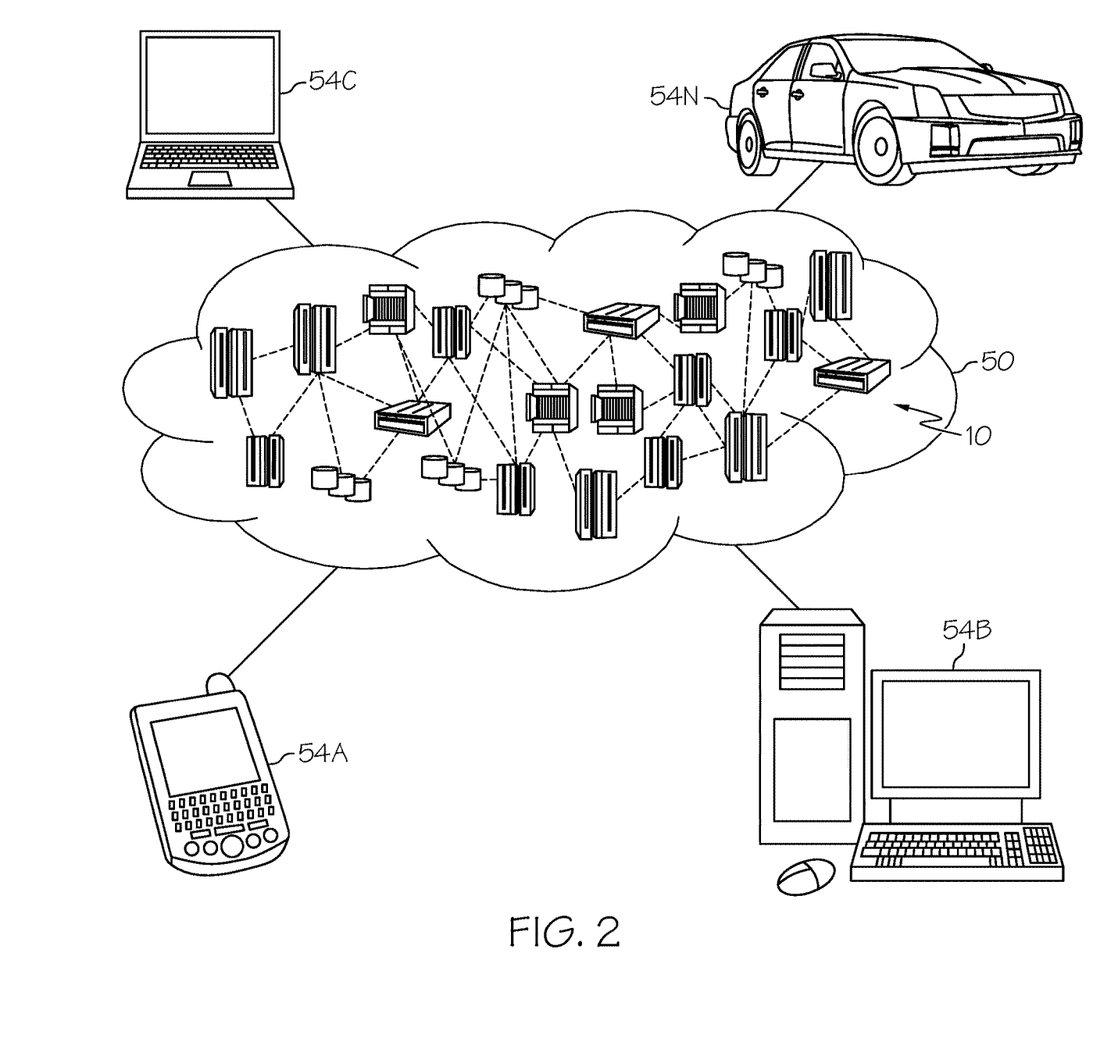
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
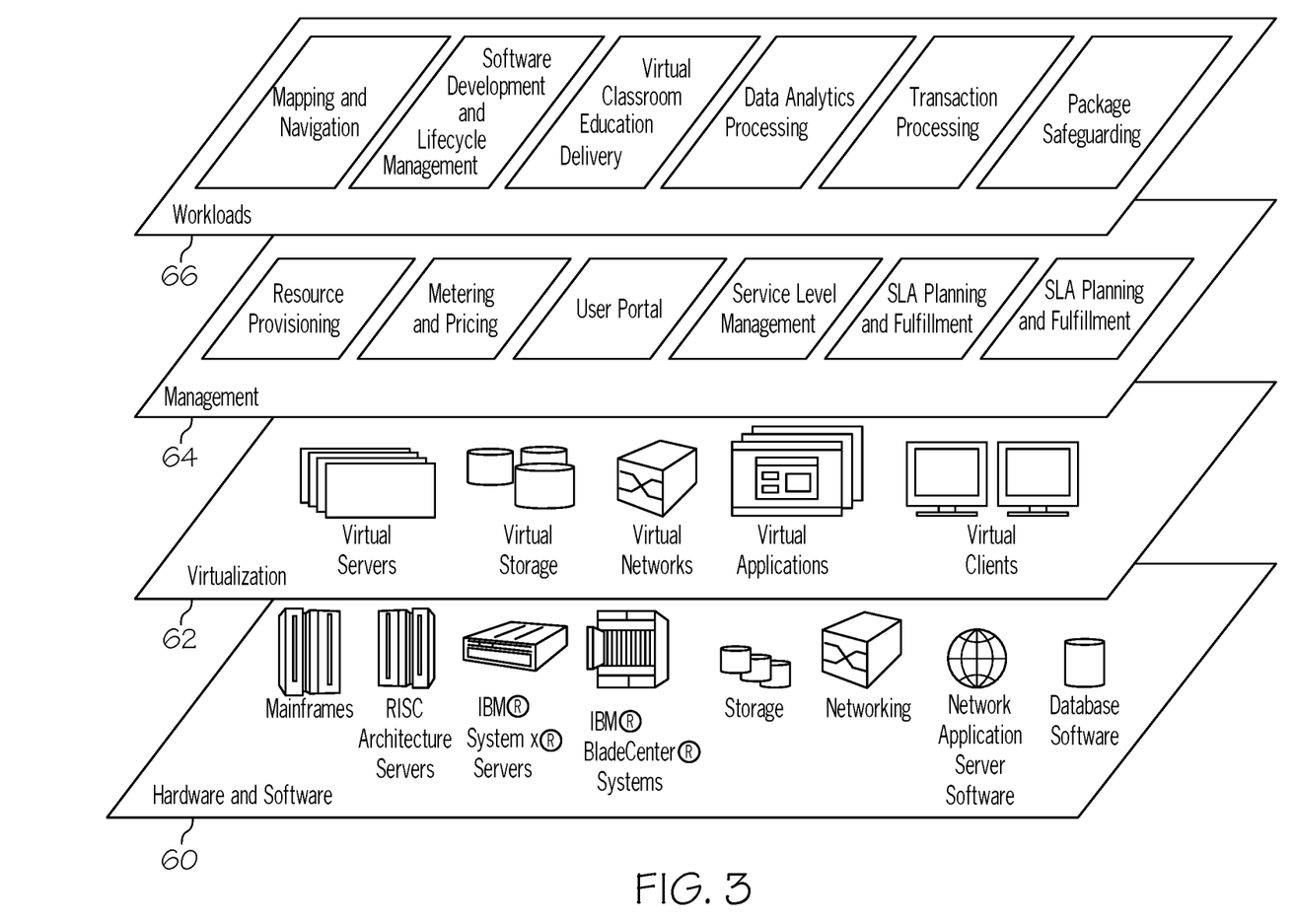
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is communication facilitation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and package safeguarding. As mentioned above, all of the foregoing examples described with respect to FIG. 3 are illustrative only, and the invention is not limited to these examples.

It is understood that all functions of the present invention as described herein typically may be performed by the communication facilitation functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Embodiments of the present invention provide an improvement to at least the field of computing devices. More specifically, embodiments improve functioning of computing devices themselves by providing a previously unknown functionality to IOT devices and systems thereof.

Figure 4:
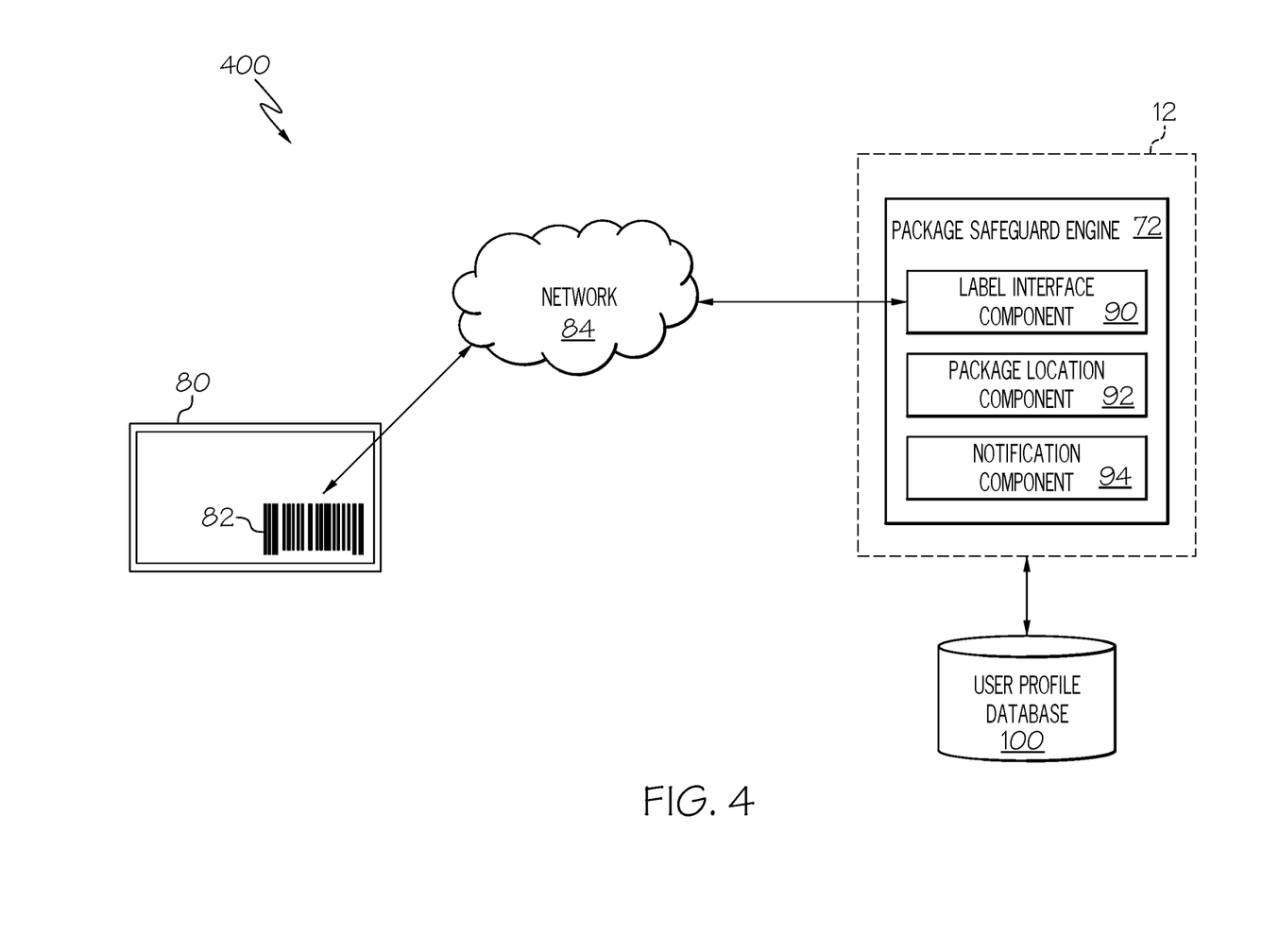
FIG. 4 depicts a system diagram according to an embodiment of the present invention.

Referring now to FIG. 4, a system diagram 400 describing the functionality discussed herein according to an embodiment of the present invention is shown. It is understood that the teachings recited herein may be practiced within any type of networked computing environment 70 (e.g., a cloud computing environment). A stand-alone computer system/server 12 is shown in FIG. 4 for illustrative purposes only. In the event the teachings recited herein are practiced in a networked computing environment 70, each physical server 80 need not have a package safeguard engine (hereinafter "system 72"). Rather, system 72 could be loaded on a server or server-capable device that communicates (e.g., wirelessly) with the physical server 80 to provide safeguarding a package for successful delivery therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 4 for brevity purposes.

Along these lines, system 72 may perform multiple functions similar to a general-purpose computer. Specifically, among other functions, system 72 can provide safeguarding a package for successful delivery in a networked computing environment 70. To accomplish this, system 72 can include: a label interface component 90, a package location component 92, and a notification component 94. As shown, package 80 includes smart label 82. Smart label 82 is configured to communicate via network 84 (e.g., the Internet) with label interface component 90, as described in detail below.

The inventors of the invention described herein have discovered certain deficiencies in the current solutions for safeguarding a package 80 from theft that is left at a doorstep when no one is at home to take delivery of the package. For example, some retailers are now offering a program that allows its customers to install an electronic lock so delivery personnel can open it to drop packages inside. The service may be tied to a security camera that sends footage of the delivery and the exit to the customer. Regardless of whether video footage is provided, many customers may feel uneasy with granting access of their home to a total stranger.

Alternatively, a customer may install their own security system in an attempt to have peace of mind for, and protect, home deliveries. However, even if surveillance video is captured of a package being illicitly taken by an individual, such a surveillance video may not yield a favorable outcome, such as their detainment and return of the package, due to the individual hiding their appearance (e.g., by wearing apparel that obscures their face) or difficulty finding someone who recognizes the individual based on the surveillance video. Even if potentially effective, it may prove too costly for someone to install their own security system at their home. To this extent, the present invention utilizes a smart label to provide information that assists in safeguarding a customer's delivered package without the need for a surveillance system or allowing entry of delivery personnel into a customer's home. Further, the present invention provides for notifying an intended recipient of unauthorized movement of a delivered package and allowing for tracking the package, which can assist in recovery of that package.

Figure 5:
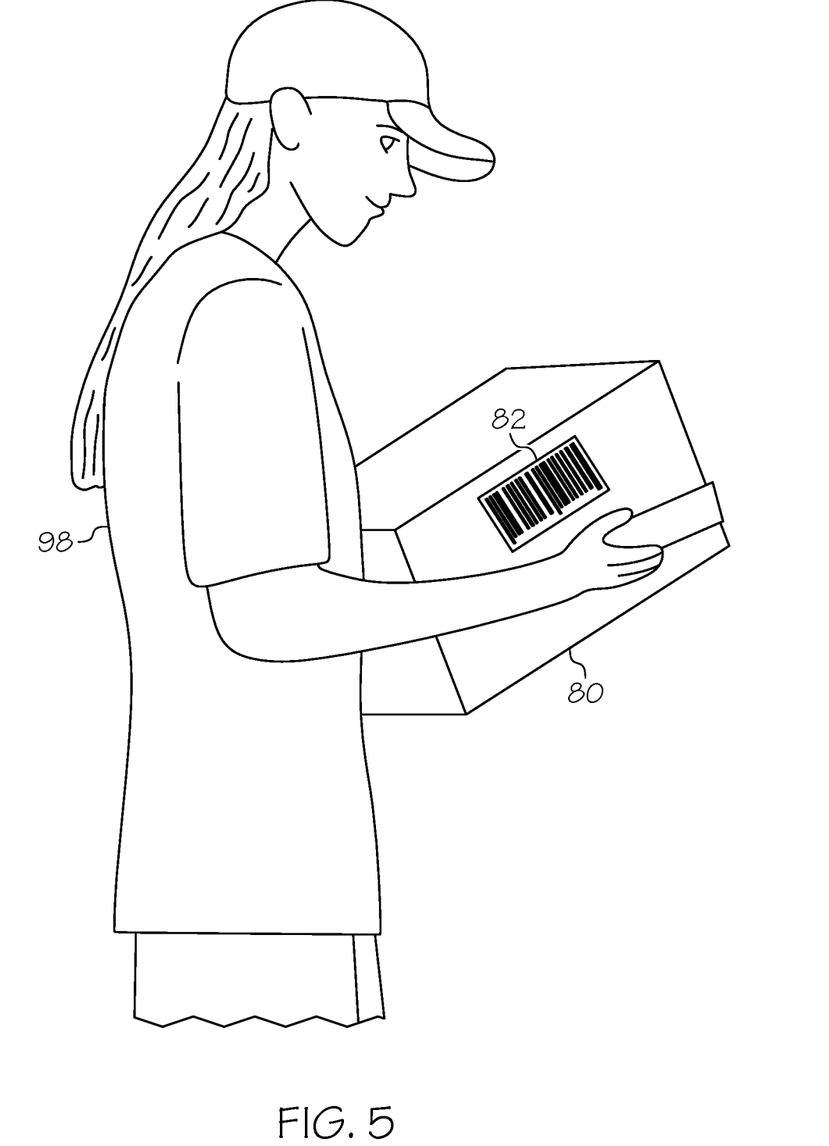
FIG. 5 depicts an example delivery of a package according to an embodiment of the present invention.

Referring now to FIG. 5 in conjunction with FIG. 4, example delivery 500 depicts delivery person 98 making a delivery of package 80 according to an embodiment of the present invention. In one embodiment, when package 80 arrives at its intended destination, smart label 82 is activated if package 80 is to be left at a customer's doorstep. Upon activation, smart label 82 begins transmitting signals to a server (e.g., label interface component 90). In an embodiment, smart label 82 can include a near-field communication (NFC) chip which, when scanned by delivery person 98 with a smartphone or other electronic device, activates smart label 82 and initiates (i) sending and receiving of radio signals, (ii) reading the package's current location and (iii) transferring information indicating the package's current location to label interface component 90. In another embodiment, a delivery vehicle (not shown) includes hardware and software that provides an initiation signal to smart label 82 that initiates (i) sending and receiving of radio signals, (ii) reading the package's current location and (iii) transferring information indicating the package's current location to label interface component 90. To that end, the delivery vehicle may initiate smart label 82 based on a determined location of the delivery vehicle using Global Positioning System (GPS) and a predetermined route that the delivery vehicle is predicted to follow. In some such embodiments, delivery vehicles initialize each and every package at different times based on a routing logistic and a delivery location for the respective package to be delivered.

In some embodiments, smart label 82 continues to send signals to label interface component 90 until smart label 82 is deactivated (e.g., taken into customer's home for a successful delivery or recovered after a theft). In one embodiment, smart label 82 is formed from a flexible substrate having a wireless transmitter such as a receiver in electrical communication with the one or more IOT sensors. In some embodiments, the transmitter sends signals indicating a current location of smart label 82 provided by the one or more IOT sensors to label interface component 90. In some embodiments, the transmitter sends such signals periodically (e.g., once every several minutes) or when receiving an incoming interrogation signal (e.g., when scanned by delivery person 98 having a compatible device). Further, in some embodiments, smart label 82 includes an internal power supply, such as a battery or capacitor, which powers smart label 82 to perform its operations. Once deactivated, smart label 82 would cease transmitting signals.

Referring back to FIG. 4, label interface component 90 of system 72, as executed by computer system/server 12, is configured to receive any number of signals from smart label 82 via network 84. In one embodiment, smart label 82 is equipped with Internet of Things (IoT) capabilities, which enables the receiving of any number of signals from smart label 82 via network 84. In general, IOT is a system of interrelated computing devices that communicate with one another. Such IOT devices (i) may be combined with various devices, objects, animals and/or people that are provided with unique identifiers and (ii) have the ability to transfer data over a network without requiring human-to-human or human-to-computer interaction. A thing, in IOT, can, as non-limiting examples, be: a person with a heart monitor implant, a farm animal with a biochip transponder, an automobile that has built-in sensors to alert the driver when tire pressure is low. In this embodiment, a thing in IOT is smart label 82, that can be assigned a unique identifier, such as an Internet Protocol (IP) address, and provided with the ability to transfer data over network 84.

In an embodiment, any number of IOT sensors may be affixed to smart label 82, whereby the IOT sensors are configured to determine a current location of smart label 82 and a proximity of smart label 82 to a desired delivery location (e.g., inside a residence). In one such embodiment, an IOT sensor uses GPS technology to determine a current location of package 80 based on a determined current location of smart label 82 and a proximity of smart label 82 to a desired delivery location. In one embodiment, the IOT sensor uses mobile phone radio towers to triangulate its position when determining a package location. For example, Global System for Mobile communications (GSM), Code Division Multiple Access (CDMA), or other cellular standard may be used to perform the triangulation.

Further, one or more of the IOT sensors may be configured for motion detection capable of identifying any directional movement related to package 80. For example, motion detection may indicate that package 80 is being picked up and moved after delivery, such as someone has taken package 80 into a desired delivery location (e.g., residence). Also, in some embodiments, package safeguard engine 72 analyses movement data received from smart label 82 to determine a type of movement that correlates to a result of the analysis to within a threshold, e.g., a match of at least 75%. For example, a result of such an analysis can indicate, but is not limited to, a determination that a package that includes smart label 82 is (i) being opened, (ii) being carried by an individual, (iii) has been placed in a vehicle, which may be moving, or (iv) has been moved by inclement weather, such as, but is not limited to, strong wind. In one such example, a result of such an analysis indicates that smart label 82 is moving erratically up and down and side to side in a single location and that the pattern of movement has a 95% match to a pattern of movement that indicates package 80 is being opened. In another example, safeguard engine 72 analyses movement data and determines that an unauthorized individual likely has taken possession of package 80 and is walking away from the delivery location.

Package location component 92 of system 72, as executed by computer system/server 12, is configured to detect when a package has been successfully delivered (e.g., taken into customer's home) or taken away from the home beyond a predefined threshold distance. For example, based on the IOT sensor signals received by label interface component 90, package location component 92 may detect that package 80 has been picked up and moved into a desired delivery location, such as a home related to the customer who purchased package 80. In that case, smart label 80 can be deactivated. Deactivation may, for example, be automatic upon a threshold distance of movement towards the delivery address or deactivation may be signaled through the purchaser of the package such as through a mobile application indicating the successful delivery of the package.

In another example, based on the IOT sensor signals received by label interface component 90, package location component 92 may detect that package 80 is being moved away from the home beyond a predefined distance threshold (e.g., 20 feet) indicating a likelihood that package 80 is being removed by an unauthorized individual. In one embodiment, a location threshold for this purpose resides in customer profile database 100. Customer profile database 100 can use any type of database structure (e.g., relational, hierarchical, etc.) to store customer data (e.g., name, delivery address, phone number, billing information, etc.), distance threshold values, notification preferences, and/or the like.

Notification component 94 of system 72, as executed by computer system/server 12, is configured to notify at least one party when a location of package 80 has exceeded its predefined distance threshold from a desired delivery location. For example, assume a few minutes after delivery person 98 leaves package 80 at a customer's doorstep, an individual removes package 80 and begins walking away from the delivery location, as is determined based on a safeguard engine 72 analysis of package 80 movement data. A predefined distance threshold of 20 feet has been established. Once package 80 exceeds this distance from the delivery location, notification component 94 transmits a notification to at least one authorized party indicating package 80 might have been removed without the consent of the receiving party, e.g., a customer that ordered package 80. A notification may include, but is not limited to, an email, a text message, a voicemail message, or any other type of communication.

In an embodiment, notification preferences may also be stored in customer profile database 100. Notification preferences may include, but not be limited to, parties to notify (e.g., customer, delivery service, neighborhood watch, police department, etc.), notification methods (e.g., text, phone call, via social media, etc.), and/or the like. For example, a customer may be notified via an installed application (or "app") on her smart phone which can include updated location information related to package 80. Since smart label 82 continues sending location data, the location of package 80 can be tracked which can assist in its recovery.

Figure 6:
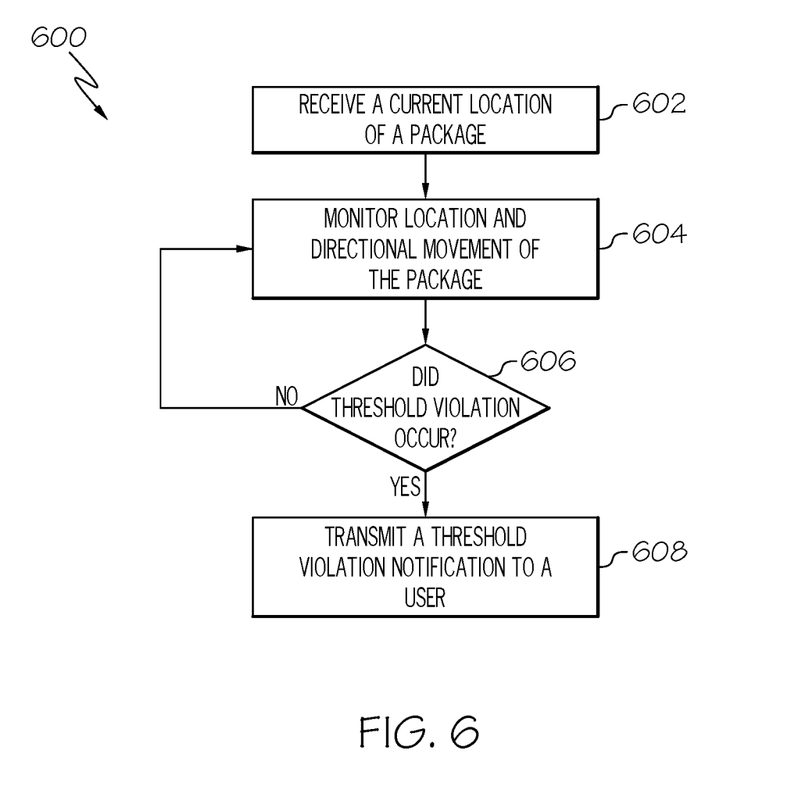
FIG. 6 depicts an example process flowchart according to an embodiment of the present invention.

Referring now to FIG. 6 in conjunctionn with FIG. 4, a process flowchart 200 according to an embodiment of the present invention is shown. At 602, label interface component 90 of system 72, as executed by computer system/server 12, receives a current location of package 80 from smart label 82 that has been delivered but left outside its desired delivery location, such as on the doorstep of a residence. At 604, label interface component 90 continues to receive location and directional movement signals from smart label 82. At 606, package location component 92 of system 72, as executed by computer system/server 12, detects whether a threshold violation occurs. For example, a predefined threshold distance may be established such that, when the location of package 80 exceeds that threshold, an assumption is made that package 80 is being removed without consent of an authorized party, e.g., the homeowner. If a violation has not occurred, the location and direction movements of package 80 continue to be monitored until a successful delivery has occurred (e.g., package 80 taken into the residence). At 608, notification component 94 of system 72, as executed by computer system/server 12, notifies at least one party (e.g., customer/user, police department official, etc.) that a threshold violation has occurred.

The process flowchart of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for integrated testing of gateway appliance services in a networked computing environment, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for facilitating a SDN communication. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for integrated testing of gateway appliance services in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for integrated testing of gateway appliance services in a networked computing environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for safeguarding a package for delivery, comprising:
   initially activating a smart label on a package while the package is in transit for delivery, the smart label being an internet of things (IOT) device having at least one sensor;
   receiving, from the smart label, a current location of the package;
   monitoring, in response to an arrival of the package at a delivery area, the location and a directional movement of the package;
   responsive to a determination of an occurrence of a threshold violation associated with the package, transmitting a threshold violation notification; and
   automatically deactivating the one or more sensors to, upon a detection by the one or more sensors a successful delivery of the package based on a movement of the package by a threshold distance in a direction of a desired delivery location corresponding to an address in a customer profile database from a delivery area, cease transmitting location and directional movement signals to a server.

2. The computer-implemented method of claim 1, wherein the threshold violation occurs when a directional movement results in a distance of the package from a desired delivery location exceeding a predefined distance threshold.

3. The computer-implemented method of claim 1, further comprising transmitting the location of the package.

4. The computer-implemented method of claim 1, further comprising activating the one or more sensors to begin transmitting location and directional movement signals to the server.

5. The computer-implemented method of claim 1, further comprising transmitting a threshold violation notification to one of: a police department official, a purchaser, a neighbor, a security guard, and a delivery service courier associated with a purchaser of the package.

6. The computer-implemented method of claim 4, further comprising activating the one or more sensors by scanning the smart label with an electronic device.

7. A computer program product embodied in a computer readable storage medium that, when executed by a computer device, performs a method for safeguarding a package for delivery in a networked computing environment, the method comprising:
   initially activating a smart label on a package while the package is in transit for delivery, the smart label being an internet of things (IOT) device having at least one sensor;
   receiving, from the smart label, a current location of the package;
   monitoring, in response to an arrival of the package at a delivery area, the location and a directional movement of the package;
   responsive to a determination of an occurrence of a threshold violation associated with the package, transmitting a threshold violation notification; and
   automatically deactivating the one or more sensors to, upon a detection by the one or more sensors a successful delivery of the package based on a movement of the package by a threshold distance in a direction of a desired delivery location corresponding to an address in a customer profile database from a delivery area, cease transmitting location and directional movement signals to a server.

8. The program product of claim 7 wherein the threshold violation occurs when a directional movement results in a distance of the package from a desired delivery location exceeding a predefined distance threshold.

9. The program product of claim 7, the method further comprising transmitting the location of the package.

10. The program product of claim 7, the method further comprising activating the one or more sensors to begin transmitting location and directional movement signals to the server.

11. The program product of claim 7, the method further comprising transmitting a threshold violation notification to a police department official associated with a purchaser of the package.

12. The program product of claim 10, the method further comprising activating the one or more sensors by scanning the smart label with an electronic device.

13. A computer system for safeguarding a package for delivery in a networked computing environment, the computer system comprising:
   a memory medium comprising instructions;
   a bus coupled to the memory medium; and
   a processor coupled to the bus that when executing the instructions cause the system to:
      initially activate a smart label on a package while the package is in transit for delivery, the smart label being an internet of things (IOT) device having at least one sensor;
      receive, from the smart label, a current location of the package;
      monitor, in response to an arrival of the package at a delivery area, the location and a directional movement of the package;
      responsive to a determination of an occurrence of a threshold violation associated with the package, transmit a threshold violation notification; and
      automatically deactivate the one or more sensors to, upon a detection by the one or more sensors a successful delivery of the package based on a movement of the package by a threshold distance in a direction of a desired delivery location corresponding to an address in a customer profile database from a delivery area, cease transmitting location and directional movement signals to a server.

14. The system of claim 13, wherein the threshold violation occurs when a directional movement results in a distance of the package from a desired delivery location exceeding a predefined distance threshold.

15. The system of claim 13, the instructions further causing the system to transmit the location of the package.

16. The system of claim 13, the instructions further causing the system to activate the one or more sensors to begin transmitting location and directional movement signals to the server.

17. The system of claim 13, wherein the networked computing environment is a cloud computing environment.

* * * * *